United States Patent
Li et al.

(10) Patent No.: US 9,344,845 B2
(45) Date of Patent: May 17, 2016

(54) METHOD AND APPARATUS FOR OBTAINING FLOATING INFORMATION OF USER FLOATING BETWEEN ADMINISTRATIVE REGIONS

(71) Applicant: ZTE Corporation, Shenzhen, Guangdong (CN)

(72) Inventors: Yigang Li, Shenzhen (CN); Zhiyu Xu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/421,951

(22) PCT Filed: Aug. 16, 2013

(86) PCT No.: PCT/CN2013/081693
§ 371 (c)(1),
(2) Date: Feb. 16, 2015

(87) PCT Pub. No.: WO2014/029300
PCT Pub. Date: Feb. 27, 2014

(65) Prior Publication Data
US 2015/0208199 A1    Jul. 23, 2015

(30) Foreign Application Priority Data

Aug. 24, 2012 (CN) .......................... 2012 1 0305273

(51) Int. Cl.
*H04W 24/00* (2009.01)
*H04W 4/02* (2009.01)
(Continued)

(52) U.S. Cl.
CPC .............. *H04W 4/021* (2013.01); *G06Q 50/26* (2013.01); *H04W 24/08* (2013.01); *H04W 60/00* (2013.01)

(58) Field of Classification Search
None
See application file for complete search history.

(56) References Cited

U.S. PATENT DOCUMENTS 6,324,399 B1   11/2001 Salmivalli
6,487,413 B1   11/2002 Suojasto

FOREIGN PATENT DOCUMENTS

CN   101640871 A   *   2/2010
CN   102118775 A       7/2011
(Continued)

OTHER PUBLICATIONS

International Search Report in international application No. PCT/CN2013/081693, mailed on Nov. 21, 2013.
(Continued)

*Primary Examiner* — Adolf Dsouza
(74) *Attorney, Agent, or Firm* — Oppedahl Patent Law Firm LLC

(57) ABSTRACT

Disclosed are a method and an apparatus for obtaining the floating information of users floating between administrative regions. The method comprises: within a floating information statistical time range for mobile phone users, making statistics for mobile phone users entering an administrative region by using final effective location information corresponding to a location update request sent by a mobile phone entering the administrative region, corresponding international mobile subscriber identity IMSI_LUP information, and a Location Area Code LAC_CONF set of the administrative region; and within the floating information statistical time range for mobile phone users, making statistics for mobile phone users leaving the administrative region by using international mobile subscriber identity IMSI_LC information of a cancel location message sent by all Home Location Registers (HLR) in the administrative region. The present invention can accurately acquire the floating condition of the inter-city, inter-province, and inter-country international mobile subscribers.

7 Claims, 8 Drawing Sheets

--- within a statistical time range of the information of the floating mobile phone users, making statistics on the mobile phone users entering an administrative region by using final valid location information contained in LUP requests sent by mobile phones entering the administrative region, IMSI_LUP information of the mobile phones entering the administrative region, and an LAC_CONF set

↓ within the statistical time range of the information of the floating mobile phone users, making statistics on the mobile phone users leaving the administrative region by using the IMSI_LC information contained in all cancel location messages sent by the HLR located in the administrative region

(51) Int. Cl.
*G06Q 50/26* (2012.01)
*H04W 24/08* (2009.01)
*H04W 60/00* (2009.01)

(56) References Cited

FOREIGN PATENT DOCUMENTS

CN 102547565 A * 7/2012
EP 1482759 A2 12/2004
EP 2182752 A1 5/2010

OTHER PUBLICATIONS

English Translation of the Written Opinion of the International Search Authority in international application No. PCT/CN2013/081693, mailed on Nov. 21, 2013.

Supplementary European Search Report in European application No. 13830849.9, mailed on Aug. 7, 2015.

* cited by examiner

Fig. 1

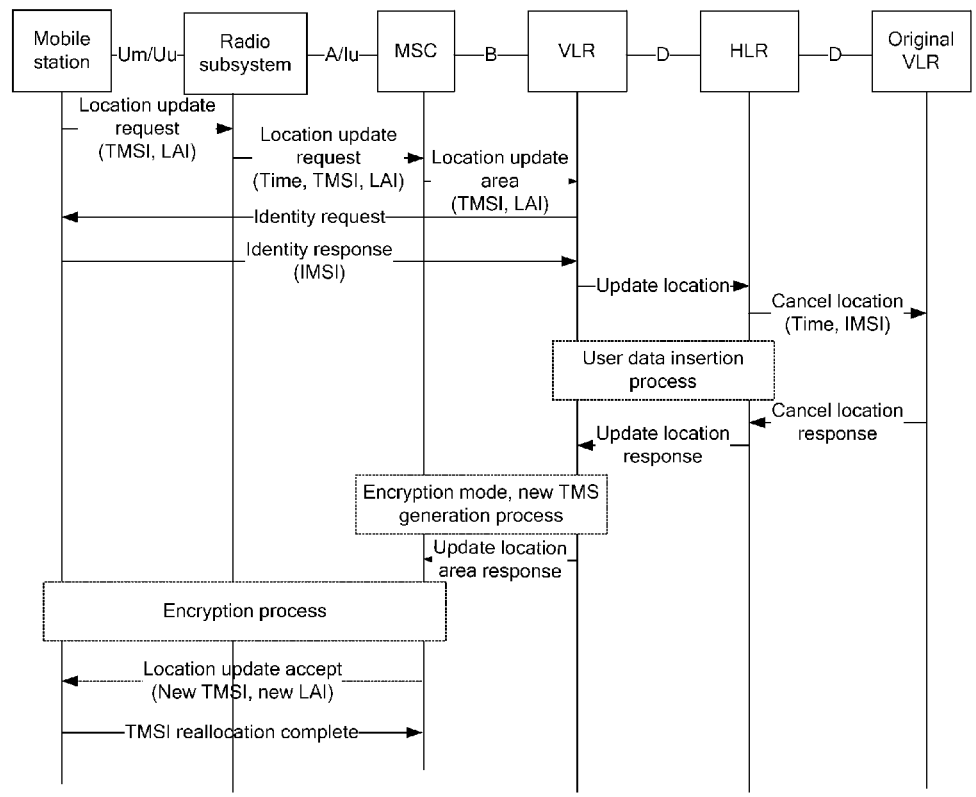

Fig. 2

| within a statistical time range of the information of the floating mobile phone users, making statistics on the mobile phone users entering an administrative region by using final valid location information contained in LUP requests sent by mobile phones entering the administrative region, IMSI_LUP information of the mobile phones entering the administrative region, and an LAC_CONF set |
|---|

↓

| within the statistical time range of the information of the floating mobile phone users, making statistics on the mobile phone users leaving the administrative region by using the IMSI_LC information contained in all cancel location messages sent by the HLR located in the administrative region |
|---|

METHOD AND APPARATUS FOR OBTAINING FLOATING INFORMATION OF USER FLOATING BETWEEN ADMINISTRATIVE REGIONS

TECHNICAL FIELD

The disclosure relates to the field of population floating information statistics, and in particular to a method and device for obtaining information of users floating between administrative regions by virtue of the mobile communication technology.

BACKGROUND

Nowadays, global transport facilities are increasingly developed, and along with the rapid development of economy, populations float frequently between different places, but there is yet no effective means for statistics about the floating information of the populations floating between different places. At present, information about people entering and leaving an administrative region can be roughly obtained mainly by methods as follows:

1. Information about the people entering and leaving the administrative region from an airport, a railway station, a coach station and a port can be obtained by querying information about passengers of a flight, a train, a coach and a ship; and 2. Information about native populations and migrants can be obtained by population census.

The populations can float between different places by virtue of profit-making tools such as airplanes, trains, coaches and ships as well as non-profit tools such as buses, wagons and motorcycles. For the condition that people take the non-profit tools, information about the people entering and leaving the administrative regions cannot be obtained by a conventional means, so that information obtained by the first method is not so accurate. Although the second method (population census method) is relatively accurate, a population census period is too long (taking a number of years), and the information about the people entering and leaving the administrative regions cannot be dynamically obtained, so that a requirement of daily statistics cannot be met.

Along with the development of mobile communication, almost every adult has a mobile phone. For example, up to April 2012, there have been more than 1 billion of mobile phone users in China, and the popularizing rate of mobile phones among adults has approached 100 percent. Therefore, this becomes the basis for obtaining the information about the people floating between the administrative regions by means of the mobile communication technology.

An International Mobile Subscriber Identity (IMSI), used to identify a mobile user, is stored in a Subscriber Identity Module (SIM) card, a Home Location Register (HLR) and a Visitor Location Register (VLR) respectively.

The HLR is responsible for managing the mobile user and storing the registration data of an administrated user and the location information of the mobile user, and includes information such as the IMSI of the user, a Mobile Subscriber International Integrated Services Digital Network/Public Switched Telephone Network (ISDN/PSTN) Number (MSISDN) and a Mobile Switching Centre (MSC)/VLR where the user is located.

The VLR stores the information of all mobile stations in the region administrated by the VLR, and includes information such as the IMSI of the user, the MSISDN, a Temporary Mobile Subscriber Identity (TMSI), location areas where the mobile stations are registered, a supplementary service parameter.

A Location Area Code (LAC) covers a geographic region, and the geographic region covered by the LAC can be large or small, and is generally divided according to a paging amount and the administrative region.

In a conventional mobile communication system, the relationship among a prefectural administrative region, the LAC, the MSC, the VLR and the HLR is as follows:

1) the MSC and the VLR are in a one-to-one relationship;

2) one prefectural administrative region includes one or more LAC regions, and there is no LAC crossing two prefectural administrative regions;

3) one prefectural administrative region includes one or more HLRs, and there is no HLR crossing two prefectural administrative regions; and 4) one prefectural administrative region includes one or more MSCs/VLRs, and there is no MSC/VLR crossing two geographic administrative regions.

During the standby stage of the mobile station, if it is detected that the location area of the mobile station is changed, a location update flow is initiated to a network. The mobile station sends a Location Update Request message to the network at first, the Location Update Request message including the final valid TMSI and final valid Location Area Identity (LAI) of the mobile station and a location update type. A reason for location update caused by the change in the location area is "Normal".

The TMSI is allocated by the VLR.

The LAI is configured for the location update of the mobile user, and includes:

LAI=Mobile Country Code (MCC)+Mobile Network Code (MNC)+LAC. The MCC is configured to identify different countries, for example, the MCC of China is 460. The MNC is configured to identify different operators in a country, for example, the MNC of China Mobile is 00 and the MNC of China Unicom is 01.

The VLR can identify the IMSI according to the TMSI and the LAI. When the mobile station leaves a region administrated by a VLR and enters a region administrated by a new VLR, if the new VLR does not have the TMSI and the LAI, an Identity Request message is sent to the mobile station to request the mobile station to transmit the IMSI. The mobile station carries the IMSI in an Identity Response message, and sends the Identity Response message to the new VLR.

Once the new VLR determines the IMSI of the mobile station, the new VLR notifies the HLR to which the mobile station belongs of that the mobile station has entered the region administrated by the new VLR. The HLR updates the location information of the mobile station as the information of the new VLR, and the HLR notifies, by virtue of a Cancel Location message (including the IMSI of the mobile station), the original VLR where the mobile station was located to delete the information of the mobile station.

Then, the new VLR allocates a new TMSI to the mobile station, and the new TMSI and a new LAI are carried in a Location Update Accept message, which is transmitted to the mobile station.

In response to the received Location Update Accept message containing the new TMSI and the new LAI, the mobile station sends back a TMSI Reallocation Complete message. The location update process finishes.

From the relationship between the geographic administrative region and the VLR, it can be determined that the location update across geographic regions above the prefectural level is definitely trans-VLR normal location update.

For the trans-VLR normal location update, the reason for location update is "Normal", and user identities carried in the Location Update Request message are the TMSI and the LAI. The VLR transmits the Identity Request message to the mobile station to request the mobile station for the IMSI, and the mobile station transmits the Identity Response message carrying the IMSI to the VLR.

The location update flow is shown as FIG. 1.

The interface D is an interface between the HLR and the VLR, and is responsible for bearing a message between the HLR and the VLR.

The interface A is an interface of a Global System for Mobile Communications (GSM) system between the MSC and a Base Station Controller (BSC), and is responsible for bearing a message between the MSC and the BSC.

The interface Iu is an interface under the Wideband Code Division Multiple Access (WCDMA) system or the Time Division-Synchronization Code Division Multiple Access (TD-SCDMA) system. The interface Iu is an interface between the MSC and a Radio Network Controller (RNC), and is responsible for bearing a message between the MSC and the RNC.

The interface Um is an interface between a mobile station of the GSM system and a GSM radio subsystem, and is responsible for bearing a message between the mobile station and the radio subsystem.

The interface Uu is an interface between a mobile station of the WCDMA system or the TD-SCDMA system and a WCDMA radio subsystem or a TD-SCDMA radio subsystem, and is responsible for bearing a message between the mobile station and the radio subsystem.

The locations of the interface D, the interface A, the interface Iu, the interface Um and the interface Uu in a mobile communication network are shown in FIG. 1.

The Cancel Location message on the interface between the HLR and the VLR and the Location Update Request message on the interface between the radio subsystem and a MSC are not transmitted on the same interface, it is thus difficult to directly obtain a time difference between the Cancel Location message and the Location Update Request message.

From FIG. 1, it is known the Location Update Accept message on the interface between the radio subsystem and the MSC is transmitted after the Cancel Location message on the interface between the HLR and the VLR, and thus it can be seen that a time difference between the Location Update Accept message and the Location Update Request message is greater than the time difference between the Cancel Location message and the Location Update Request message.

For Frequency Division Duplex-Long Term Evolution (FDD-LTE) and Time Division Duplex-Long Term Evolution (TDD-LTE) networks, main differences related to this disclosure are as follows:

A network element Home Subscriber Server (HSS) in an LTE network is corresponding to the HLR in a GSM/WCDMA/TD-SCDMA network.

A Tracking Area Code (TAC) in the LTE network is corresponding to the LAC in the GSM/WCDMA/TD-SCDMA network.

Tracking Area Update in the LTE network is corresponding to Location Update in the GSM/WCDMA/TD-SCDMA network.

There is no MSC/VLR of a Circuit Switched (CS) domain in the LTE network. The Mobility Management Entity (MME) in the LTE network is corresponding to the Serving GPRS Support Node (SGSN) of a Packet Switched (PS) domain in a 2nd-Generation (2G) and 3rd-Generation (3G) networks.

A tracking area update flow of the FDD-LTE network and the TDD-LTE network is shown in FIG. 8.

Based on the above description, it comes to the inventor's attention that it may be possible to obtain the information of users floating between administrative regions using the mobile communication technology, in order to improve the accuracy of the obtained information of the users floating between administrative regions. However, until now there has been no related technical solution for obtaining the information of the users floating between the administrative regions using the mobile communication technology.

SUMMARY

A purpose of the disclosure is provide a method and apparatus for obtaining the information of users floating between administrative regions, so as to solve the problem that the information of the users floating between the administrative regions cannot be accurately obtained in the prior art.

According to one aspect of the embodiment of the disclosure, a method for obtaining the information of mobile phone users floating administrative regions is provided, which includes the following steps of:

within a statistical time range of the information of floating mobile phone users, making statistics on the mobile phone users entering an administrative region by virtue of final valid location information contained in location update requests sent by the mobile phones entering the administrative region, IMSI_LUP information of the mobile phones entering the administrative region and an LAC_CONF set; and within the statistical time range of the information of the floating mobile phone users, making statistics on the mobile phone users leaving the administrative region by virtue of IMSI_LC information contained in all cancel location messages sent by an HLR in the administrative region.

Preferably, the operation of making statistics on the mobile phone users entering the administrative region may include: searching out one by one an LAC which corresponds to the final valid location information but is beyond the LAC_CONF set, and determining a mobile phone user whose IMSI_LUP information corresponds to the LAC beyond the LAC_CONF set as the user entering the administrative region.

Preferably, the operation of making statistics on the mobile phone users leaving the administrative region may include: performing one-by-one searching to determine whether the IMSI_LC in each cancel location message is subjected to location update or tracking area update before the cancel location message is sent, and determining a mobile phone user whose IMSI_LC is not subjected to the location update or tracking area update as the user leaving the administrative region.

Preferably, the final valid location information contained in the location update request and the IMSI_LUP information of the mobile phones entering the administrative region may be obtained in a manner of:

acquiring and recording all trans-VLR location update or tracking area update flows on an interface A between a radio subsystem and an MSC or an MME within whole coverage of a network element for data acquisition in the administrative region;

obtaining sending time (TIME_LUP) of location update request messages or tracking area request messages and LAC_LUPs from the location update request messages or the tracking area request messages of the mobile phones;

obtaining the IMSI_LUPs from identity response messages; and establishing a first list comprising the TIME_LUP, the LAC_LUP and the IMSI_LUP for each location update or tracking area update.

Preferably, the LAC_CONF set may be obtained in a manner of:

acquiring the LAC_CONF set within the whole coverage of the network element for data acquisition in the administrative region, and establishing a second list comprising all the LAC_CONFs.

Preferably, the operation of making statistics on the mobile phone users entering the administrative region may include:

searching out records in which the TIME_LUP is within the statistical time range from the first list one by one;

determining one by one whether the LAC_LUP corresponding to the TIME_LUP which is within the statistical time range is included in the second list containing the LAC_CONF set; and determining the mobile phone user corresponding to the LAC_LUP which is not included in the LAC_CONF set as the user entering the administrative region.

Preferably, the IMSI_LC information contained in all the cancel location messages sent by the HLR in the administrative region may be obtained in a manner of:

acquiring and recording all cancel location messages which are sent from the HLR or a HSS to the VLR on an interface D between the HLR or HSS and the VLR or the MME within the whole coverage of the network element for data acquisition in the administrative region;

obtaining sending time (TIME_LC) of each cancel location message and the IMSI_LC in each cancel location message; and establishing a third list comprising the TIME_LC and IMSI_LC corresponding to each cancel location message.

Preferably, the making statistics on the mobile phone users leaving the administrative region may include:

searching out records in which the TIME_LC is within the statistical time range from the third list one by one;

extracting an IMSI_LC from the record in which the TIME_LC is within the statistical time range;

determining whether there is an IMSI_LUP in the first list corresponding to the extracted IMSI_LC when the TIME_LUP is between Time_LC-$\Delta$t-Tc21 and Time_LC-$\Delta$t; and in the case there is no IMSI_LUP in the first list corresponding to the extracted IMSI_LC when the TIME_LUP is between Time_LC-$\Delta$t-Tc21 and Time_LC-$\Delta$t, determining the user corresponding to the extracted IMSI_LC as the user leaving the administrative region.

$\Delta$t is a clock difference between the interface A and the interface D, and Tc21 is a maximum signalling time difference between a location update request on the interface A and the cancel location message on the interface D.

According to the other aspect of the embodiment of the disclosure, a device for obtaining information of mobile phone users floating between administrative regions is provided, which includes:

an administrative-region-entering user information acquisition module, configured to, within a statistical time range of the information of floating mobile phone users, make statistics on the mobile phone users entering an administrative region by virtue of final valid location information contained in location update requests sent by the mobile phones entering the administrative region, IMSI_LUP information of the mobile phones entering the administrative region and an LAC_CONF set; and an administrative-region-leaving user information acquisition module, configured to, within the statistical time range of the information of the floating mobile phone users, make statistics on the mobile phone users leaving the administrative region by virtue of IMSI_LC information contained in all cancel location messages sent by an HLR in the administrative region.

Preferably, the administrative-region-entering user information acquisition module may include:

a first searching module, configured to search out an LAC which corresponds to the final valid location information but is beyond the LAC_CONF set; and a first statistical module, configured to determine a mobile phone user whose IMSI_LUP information corresponds to the LAC beyond the LAC_CONF set as the user entering the administrative region.

Preferably, the administrative-region-leaving user information acquisition module may include:

a second searching module, configured to perform one-by-one searching to determine whether the IMSI_LC in each cancel location message is subjected to location update or tracking area update before the cancel location message is sent; and a second statistical module, configured to determine a mobile phone user whose IMSI_LC is not subjected to location update or tracking area update as the users leaving the administrative region.

According to the embodiments of the disclosure, by determining whether the LAC or TAC reported during the location update or tracking area update within a statistical area is within a LAC or TAC set to which the statistical area belongs, the information of a user entering the administrative region is obtained. Moreover, an IMSI in a cancel location message is extracted, and it is determined whether the extracted IMSI is subjected to location update or tracking area update within the statistical area before the transmission time of the cancel location messages, so that the information of a user leaving the administrative region is obtained. Therefore, with the embodiments of the disclosure, the information of mobile users floating between cities, provinces and countries can be acquired more accurately. In addition, to implement the embodiments of the disclosure, it is unnecessary to modify the current core network and radio access network, and thus the investment cost of an operator is greatly lowered.

BRIEF DESCRIPTION OF THE DRAWINGS

FIG. 1 is a trans-VLR location update flow;

FIG. 2 is a diagram of a method for obtaining information of mobile phone users floating between administrative regions according to an embodiment of the disclosure;

DETAILED DESCRIPTION

FIG. 2 is a method for obtaining information of mobile phone users floating between administrative regions according to an embodiment of the disclosure, and as shown in FIG. 2, the method includes the following steps of:

within a statistical time range of the information of the floating mobile phone users, making statistics on the mobile phone users entering an administrative region by using final valid location information contained in Location UPdate (LUP) requests sent by mobile phones entering the administrative region, IMSI_LUP information of the mobile phones entering the administrative region, and an LAC_CONF set (LAC_CONF refers to the LAC of the administrative region); and within the statistical time range of the information of the floating mobile phone users, making statistics on the mobile phone users leaving the administrative region by using the IMSI_LC information contained in all cancel location messages sent by the HLR located in the administrative region.

The operation of making statistics on the mobile phone users entering an administrative region may include: determining one by one an LAC which corresponds to the final valid location information but is beyond the LAC_CONF set, and determining a mobile phone user whose IMSI_LUP information corresponds to the LAC beyond the LAC_CONF set as the user entering the administrative region.

The operation of making statistics on the mobile phone users leaving the administrative region may include: determining one by one whether the IMSI_LC in each cancel location message is subjected to location update or tracking area update or not before the message is sent, and determining a mobile phone user whose IMSI_LC is is not subjected to the location update or tracking area update as the user leaving the administrative region.

Figure 4:
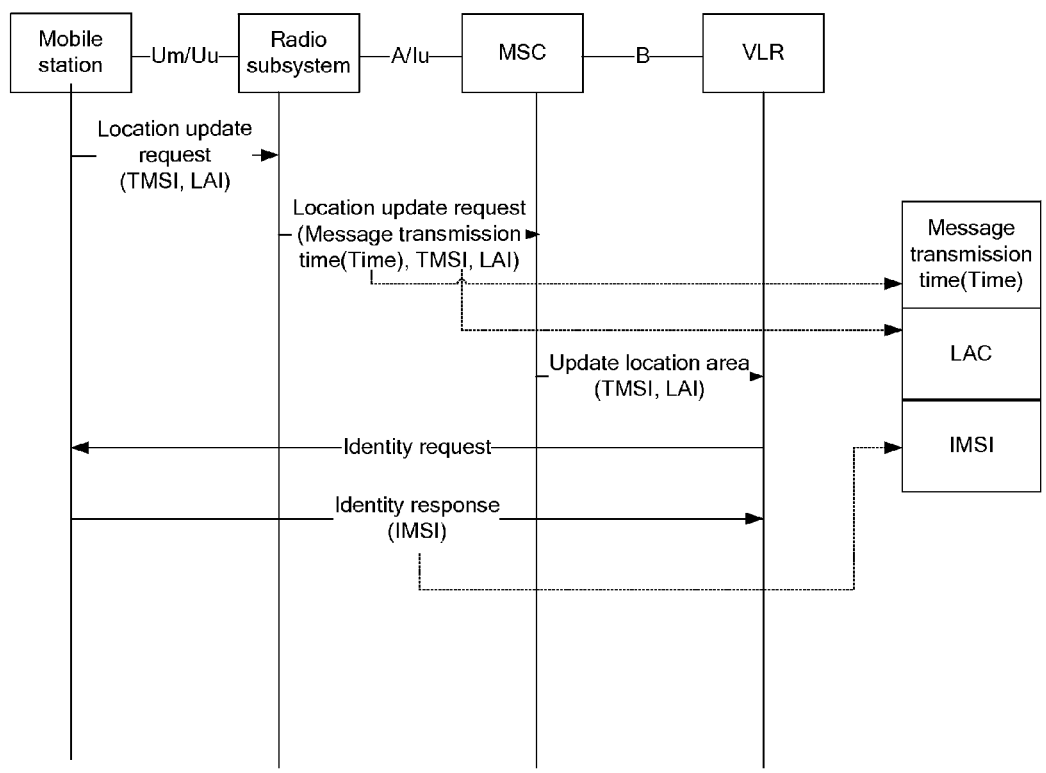
FIG. 4 is a diagram of a process of extracting required information from a trans-VLR location update flow according to an embodiment of the disclosure.
Figure 9:
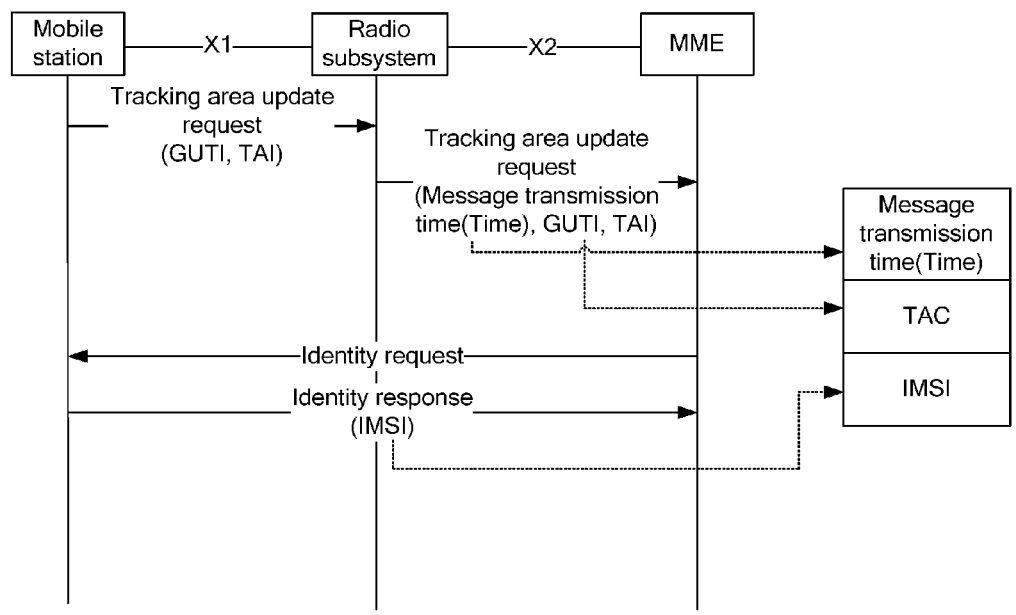
FIG. 9 is a diagram of a process of extracting required information from a trans-MME tracking area update flow according to an embodiment of the disclosure.

As shown in FIG. 4 and FIG. 9, the final valid location information contained in the location update request and the IMSI_LUP information of the mobile phones entering the administrative region may be obtained in a manner of:

acquiring and recording all trans-VLR location update or tracking area update flows on the interface A between a radio subsystem and an MSC or an MME within the whole coverage of the data acquisition network element in the administrative region, obtaining the message transmission time (TIME_LUP) and the LAC_LUPs from location update request or tracking area request messages of the mobile phones, obtaining the IMSI_LUPs from corresponding identity response messages, and establishing a first list including the TIME_LUP, the LAC_LUPs and the IMSI_LUPs for all the location updates or tracking area updates.

The first list includes N (N is an integer greater than 1) records corresponding to all location updates or tracking area updates, and each records includes the TIME_LUP, LAC_LUP and IMSI_LUP corresponding to one update.

The LAC_CONF set may be obtained in a manner of:
acquiring the LAC_CONF set within the whole coverage of the data acquisition network element in the administrative region, and establishing a second list including all the LAC_CONFs.

After the first list and the second list are established, statistics on the mobile phone users entering the administrative region may be made in a manner of:

reviewing the records of the TIME_LUP in the first list within the statistical time range one by one, determining one by one whether the LAC_LUP corresponding to the the TIME_LUP which is within the statistical time range is included in the LAC_CONF set of the second list or not, and determining the mobile phone users corresponding to the LAC_LUP which is not included in the LAC_CONF set as the users entering the administrative region.

Figure 5:
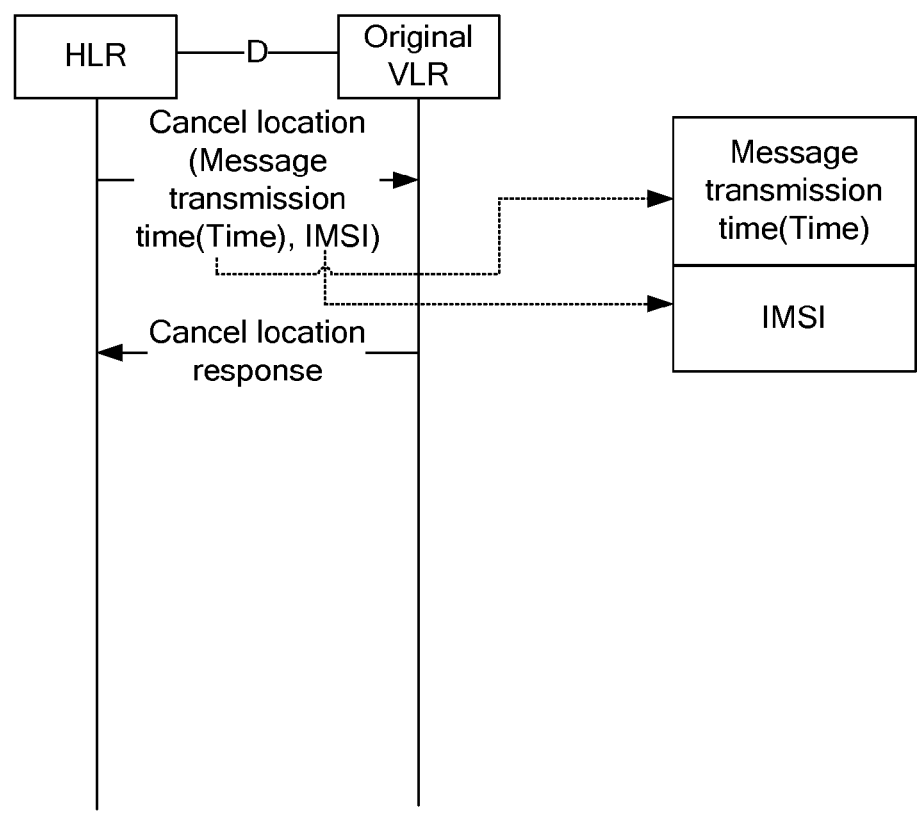
FIG. 5 is a diagram of a process of extracting required information from a trans-VLR location update flow according to an embodiment of the disclosure.
Figure 10:
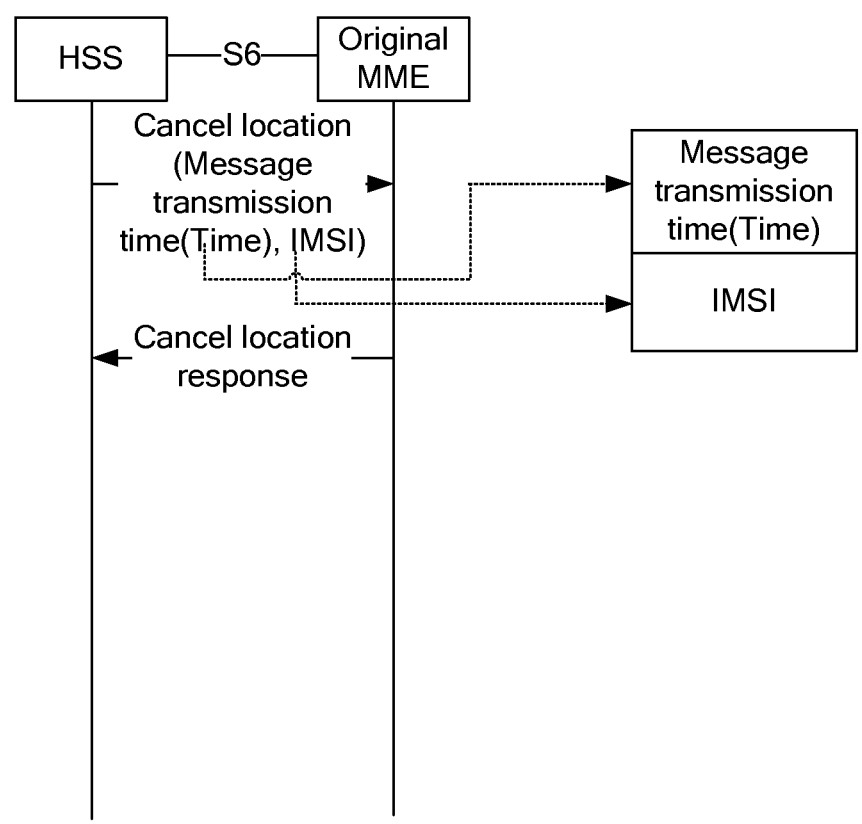
FIG. 10 is a diagram of a process of acquiring required information from a trans-MME tracking area update flow according to an embodiment of the disclosure.

As shown in FIG. 5 and FIG. 10, all the IMSI_LC information contained in the cancel location messages sent by the HLR located in the administrative region may be obtained in a manner of:

acquiring and recording all cancel location messages which are sent from the HLR or HSS to the VLR or MME on the interface D between the HLR or HSS and the VLR or MME within the whole coverage of the data acquisition network element(s) in the administrative region, obtaining the message transmission time TIME_LC and the IMSI_LC from each cancel location message, and establishing a third list including the TIME_LC and IMSI_LC corresponding to each cancel location message.

The third list includes K (K is an integer greater than 1) records corresponding to all the cancel location messages, and each record includes the TIME_LC and IMSI_LC corresponding to one cancel location message.

After the first list and the third list are established, statistics on the mobile phone users leaving the administrative region may be made in a manner of:

reviewing the records of TIME_LC in the third list within the statistical time range one by one;

extracting an IMSI_LC from a record;

checking whether there is an IMSI_LUP in the first list corresponding to the extracted IMSI_LC when the TIME_LUP is within the time range between Time_LC-$\Delta$t-Tc21 and Time_LC-$\Delta$t; and if there is not, determining the user corresponding to the extracted IMSI_LC as the user leaving the administrative region.

$\Delta$t is a clock difference between the interface A and the interface D, and Tc21 is a maximum signalling time difference between a location update request on the interface A and the cancel location message on the interface D.

Figure 3:
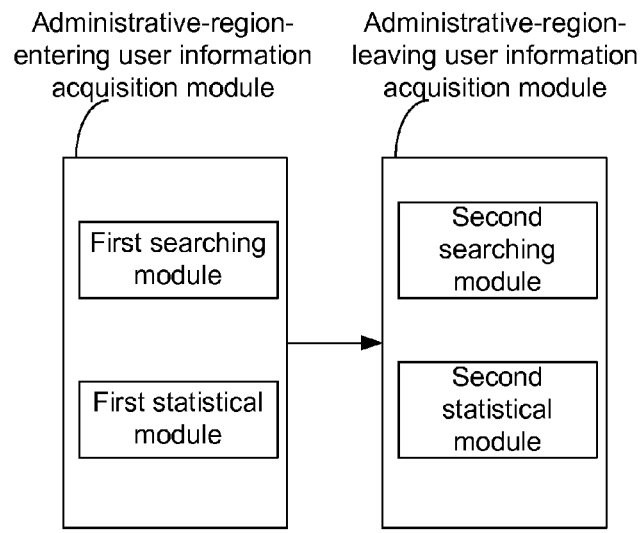
FIG. 3 is a diagram of a device for obtaining information of mobile phone users floating between administrative regions according to an embodiment of the disclosure.

FIG. 3 is a device for obtaining the information of mobile phone users floating between administrative regions, and as shown in FIG. 3, the device includes an administrative-region-entering user information acquisition module and an administrative-region-leaving user information acquisition module.

The administrative-region-entering user information acquisition module is configured to, within a statistical time range of the information of the floating mobile phone users, make statistics on the mobile phone users entering an administrative region by using final valid location information contained in Location UPdate (LUP) requests sent by mobile phones entering the administrative region, IMSI_LUP information of the mobile phones entering the administrative region, and an LAC_CONF set.

The administrative-region-leaving user information acquisition module is configured to, within the statistical time range of the information of the floating mobile phone users, make statistics on the mobile phone users leaving the administrative region by using the IMSI_LC information contained in all cancel location messages sent by the HLR located in the administrative region.

As shown in FIG. 3, the administrative-region-entering user information acquisition module may include a first searching module and a first statistic module. The first searching module is configured to search out one by one an LAC which corresponds to the final valid location information but is beyond the LAC_CONF set. The first statistic module is configured to determine a mobile phone user whose IMSI_LUP information corresponds to the LAC beyond the LAC_CONF set as the user entering the administrative region.

As shown in FIG. 3, the administrative-region-leaving user information acquisition module may include a second searching module and a second statistic module. The second searching module is configured to determine one by one whether the IMSI_LC in each cancel location message is subjected to location update or tracking area update before the message is sent. The second statistic module is configured to determine a mobile phone user whose IMSI_LC is not subjected to location update or tracking area update as the user leaving the administrative region.

The disclosure is further described below with reference to two specific embodiments.

Embodiment 1

A mobile communication network of China Mobile in a city A is taken as an example, and the embodiment describes main steps of a method for obtaining, based on the mobile communication technology, the amount of China Mobile users entering the administrative region of the city A, the amount of China Mobile users leaving the administrative region, and associated user lists; the amount of native China Mobile users entering the administrative region, the amount of native China Mobile users leaving the administrative region, and associated user lists; the amount of foreign China Mobile users entering the administrative region, the amount of foreign China Mobile users leaving the administrative region, and associated user lists.

It is supposed that the statistic is performed within the GSM network and the TD-SCDMA network of the China Mobile branch in city A. The amount of GSM network users entering and leaving the administrative region are obtained by the following steps.

Step 1: it is set the following parameters: starting time Tstart and ending time Tend for statistics; the amount of users entering the administrative region S1, the amount of users leaving the administrative region S2, the amount of foreign users entering the administrative region S3, the amount of foreign users leaving the administrative region S4, the amount of native users entering the administrative region S5, and the amount of native users leaving the administrative region S6; a list containing users entering the administrative region T1, a list containing users leaving the administrative region T2, a list containing foreign users entering the administrative region T3, a list containing foreign users leaving the administrative region T4, a list containing native users entering the administrative region T5, and a list containing native users leaving the administrative region T6; and a maximum signalling time difference Tc21 between Cancel Location and a Location Update Request.

Step 2: the GSM network coverage of the whole city A is selected for data acquisition.

Step 3: as shown in FIG. 4, by virtue of a method of signalling tracking on the interface A, it is acquired and recorded location update messages of which the location update type is "Normal" within the whole network coverage of city A. It is obtained the sending time TIME_LUP of the Location Update Request message, and an LAI in the Location Update Request. It is further obtained an LAC from the LAI. If there is an Identity Response message during this location update, then it is obtained the IMSI_LUP from the Identity Response message, or obtained the IMSI_LUP from a Common ID message. They are shown in Table 1 (i.e. the first list).

TABLE 1

| TIME_LUP | LAC_LUP | IMSI_LUP |
|---|---|---|
|  |  |  |
|  |  |  |
|  |  |  |
|  |  |  |

Step 4: within the time range from Tstart to Tend, by virtue of the method of signalling tracking on the interface A, it is recorded all trans-VLR location update flows. It is calculated the maximum signalling time difference from the Location Update Accept message to the Location Update Request message with respect to each trans-VLR location update flow, and the maximum signalling time difference serves as Tc21.

Step 5: it is acquired a clock difference between the interface A and the interface D as shown in FIG. 1, and the clock difference is represented by $\Delta t$.

Step 6: as shown in FIG. 5, by virtue of the method of signalling tracking on the interface D, it is acquired and recorded Cancel Location messages received by all VLRs in the city A. It is also obtained Time_CL (the time when the Cancel Location message starts to be sent) and IMSI_CL information in each Cancel Location message. They are shown in Table 2 (i.e. the third list).

TABLE 2

| Time_CL | IMSI_CL |
|---|---|
|  |  |
|  |  |
|  |  |
|  |  |

Step 7: it is acquired a set of all LACs in the city A by virtue of wireless network configuration information, as shown in Table 3.

TABLE 3

| LAC_CONF |
|---|
|  |
|  |
|  |
|  |
|  |

Step 8: it is acquired a list (i.e. the second list) containing all IMSIs in all HLRs belonging to the city A, as shown in Table 4.

TABLE 4

| IMSI_HLR |
|----------|
|          |
|          |
|          |
|          |

Figure 6:
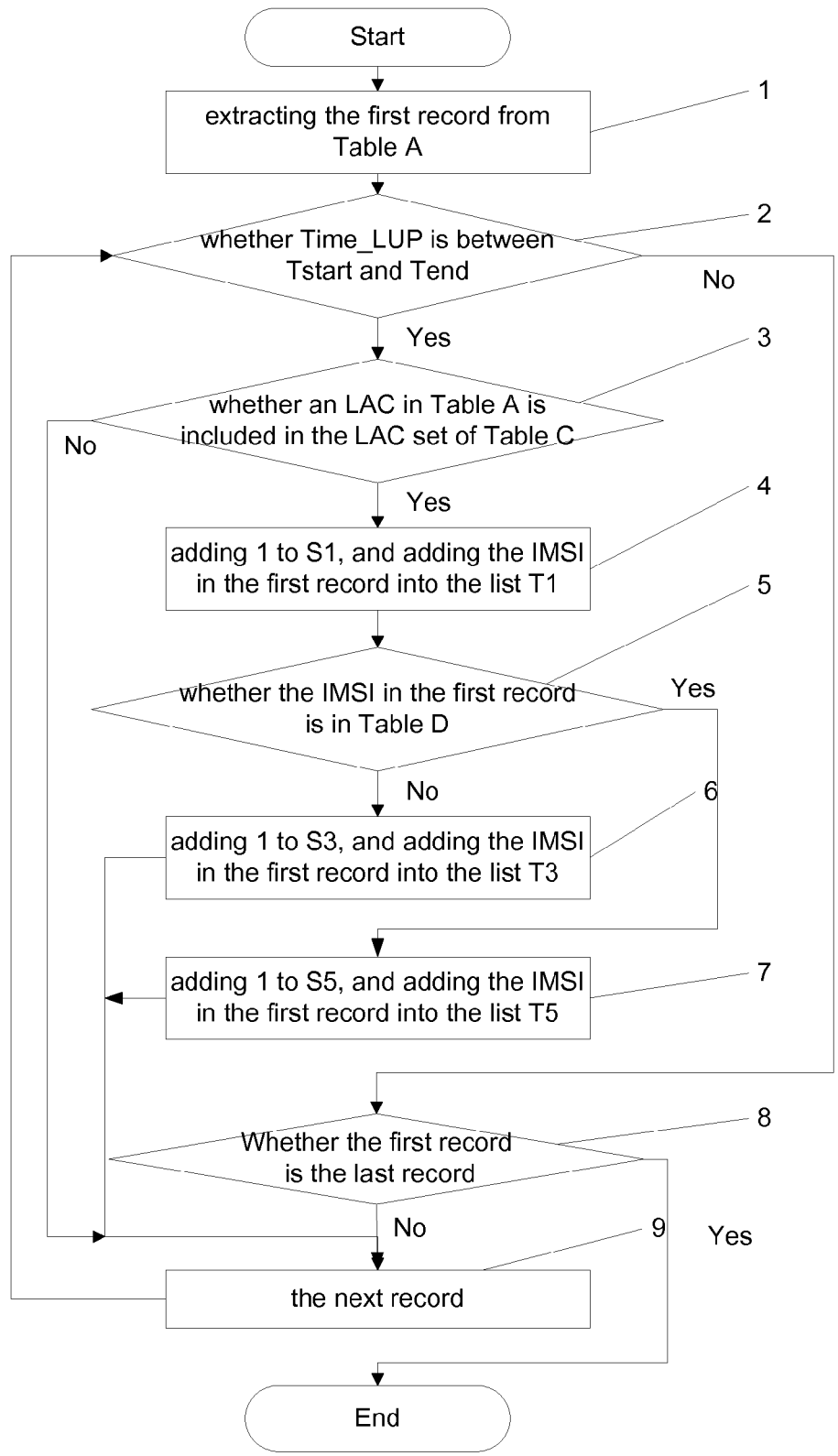
FIG. 6 is a flowchart of acquiring statistics on the number of users entering an administrative region and a user list in GSM, WCDMA and TD-SCDMA networks according to an embodiment of the disclosure.

Step 9: within the set time range from Tstart to Tend, it is searched out the records of which the TIME_LUP is between Tstart and Tend from Table 1 one by one. It is determined whether the LAC_LUP corresponding to the TIME_LUP which is between Tstart and Tend is included in the LAC_CONF set in Table 3 or not. If not, S1 increases by 1, and the IMSI_LUP corresponding to the TIME_LUP which is between Tstart and Tend and corresponding to the LAC_LUP which is not included in Table 3 is added into the list T1. Furthermore, it is determined whether the IMSI_LUP corresponding to the TIME_LUP which is between Tstart and Tend is included in Table 4. If not, S3 increases by 1, and the IMSI_LUP which corresponds to the TIME_LUP between Tstart and Tend but is not included in Table 4 is added into the list T3. If yes, S5 increases by 1, and the IMSI_LUP which corresponds to the TIME_LUP between Tstart and Tend and is included in Table 4 is added into the list T5. The operation continues until all the records of which the Time_LUP is within the range of Tstart and Tend in Table 1 are determined, as shown in FIG. 6.

Figure 7:
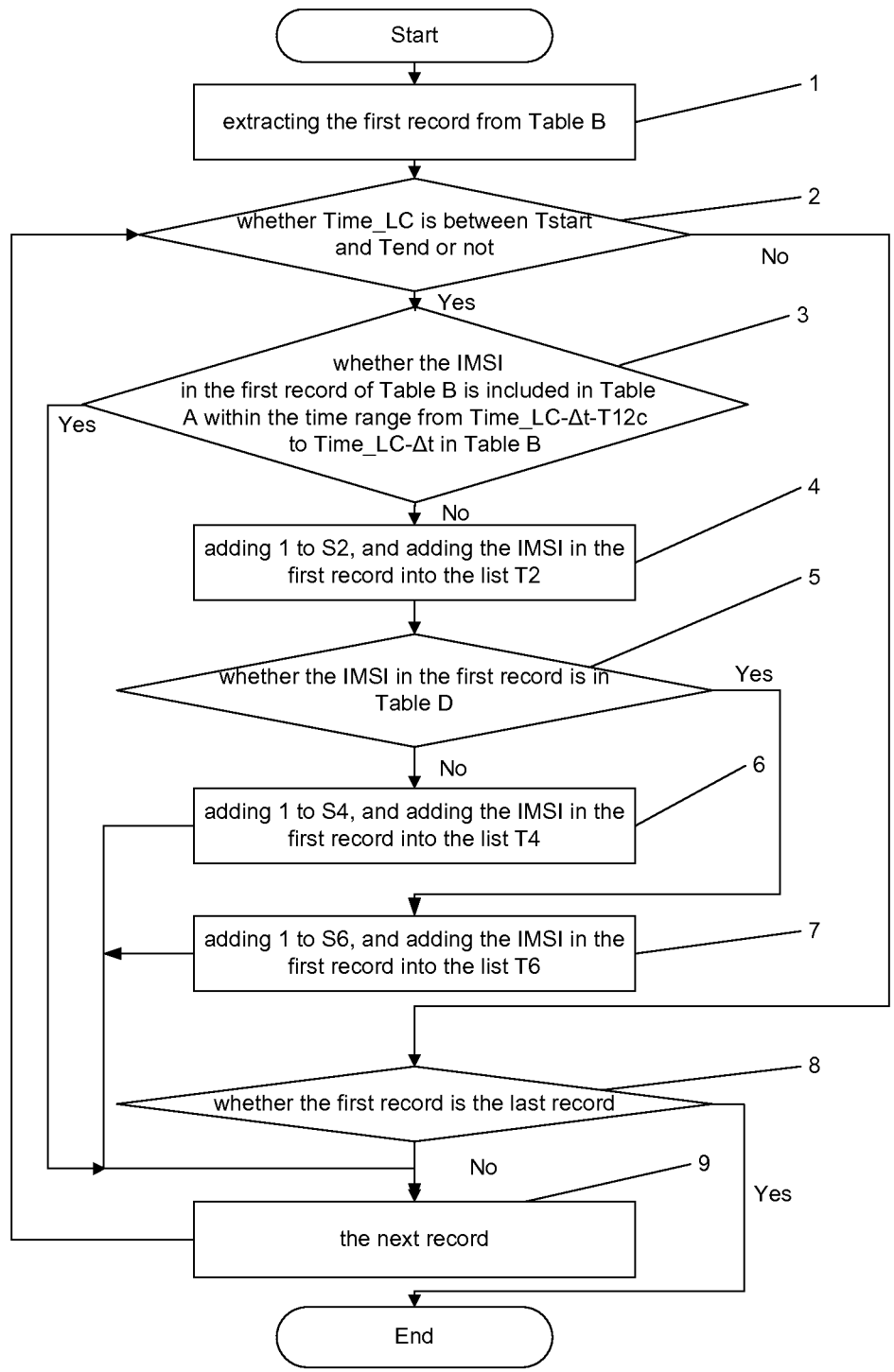
FIG. 7 is a flowchart of acquiring statistics on the number of users leaving an administrative region and a user list in GSM, WCDMA, TD-SCDMA, FDD-LTE and TDD-LTE networks according to an embodiment of the disclosure.

Step 10: within the set time range from Tstart to Tend, it is searched out the records of which the Time-CL is between Tstart and Tend from Table 2 one by one. It is determined, among records in Table 1 of which Time_LUP is within the time range from Time_CL-Δt-Tc21 to Time_CL-Δt, whether the IMSI_CL corresponding to the Time-CL which is between Tstart and Tend is subjected to location update. If not, S2 increases by 1, and the IMSI_CL which corresponds to the Time-CL between Tstart and Tend but is not subjected to location update is added into the list T2. Furthermore, it is determined whether the IMSI_CL corresponding to the Time-CL which is between Tstart and Tend is included in the Table 4. If not, S4 increases by 1, and the IMSI_CL which corresponds to the Time-CL between Tstart and Tend but is not included in the Table 4 is added into the list T4. If yes, S6 increases by 1, and the IMSI_LUP which corresponds to the Time-CL between Tstart and Tend and is included in the Table 4 is added into the list T6. The operation continues until all the records of which Tc is within the range from Tstart to Tend in Table 2 are determined, as shown in FIG. 7.

Step 11: S1, S2, S3, S4, S5 and S6 in Step 9 and Step 10 are combined into a statistical table of the China-Mobile GSM network users entering and leaving the administrative region of the city A.

Step 12: according to the method for obtaining statistical table of the GSM network users entering and leaving the administrative region, it is obtained a statistical table of the China-Mobile TD-SCDMA users entering and leaving the administrative region of the city A and an IMSI list of various China-Mobile TD-SCDMA users entering and leaving the administrative region of the city A.

Step 13: the statistical tables of the GSM and TD-SCDMA users entering and leaving the administrative region are combined, and the IMSI lists of various GSM and TD-SCDMA users entering and leaving the administrative region are combined to obtain a statistical table of China Mobile users entering and leaving the administrative region of the city A as shown in Table 5 and IMSI lists of the China Mobile users entering and leaving the administrative region of the city A as shown in Table 6 to Table 11.

TABLE 5

| | |
|---|---|
| Statistics on the amount of China Mobile users entering the administrative region of the city A | S1 |
| Statistics on the amount of China Mobile users leaving the administrative region of the city A | S2 |
| Statistics on the amount of foreign China Mobile users entering the administrative region of the city A | S3 |
| Statistics on the amount of foreign China Mobile users leaving the administrative region of the city A | S4 |
| Statistics on the amount of native China Mobile users entering the administrative region of the city A | S5 |
| Statistics on the amount of native China Mobile users leaving the administrative region of the city A | S6 |

TABLE 6

| IMSI list (T1) of China Mobile users entering the administrative region of the city A |
|---|
|  |
|  |
|  |
|  |

TABLE 7

| IMSI list (T2) of China Mobile users leaving the administrative region of the city A |
|---|
|  |
|  |
|  |
|  |
|  |

TABLE 8

| IMSI list (T3) of foreign China Mobile users entering the administrative region of the city A |
|---|
|  |
|  |
|  |
|  |
|  |

TABLE 9

| IMSI list (T4) of foreign China Mobile users leaving the administrative region of the city A |
|---|
|  |
|  |
|  |
|  |

TABLE 10

| IMSI list (T5) of native China Mobile users entering the administrative region of the city A |
|---|
|  |
|  |
|  |
|  |

TABLE 11

| IMSI list (T6) of native China Mobile users leaving the administrative region of the city A |
|---|
|  |
|  |
|  |
|  |

Step 14: according to the IMSI lists of the China Mobile users entering and leaving the administrative region of the city A, it is obtained user information, such as telephone numbers, usernames and communication addresses, from the China Mobile operator in the city A.

Embodiment 2

An FDD-LTE network under an operator in a city B is taken as an example, and the embodiment describes main steps of a method for obtaining, based on the mobile communication technology, the amount of users entering the administrative region of the city B, the amount of users leaving the administrative region, and associated user lists; the amount of native users entering the administrative region, the amount of native users leaving the administrative region, and associated user lists; the amount of foreign users entering the administrative region, the amount of foreign users leaving the administrative region, and associated user lists.

Step 1: it is set the following parameters: starting time Tstart and ending time Tend for statistics; the amount of users entering the administrative region S1, the amount of users leaving the administrative region S2, the amount of foreign users entering the administrative region S3, the amount of foreign users leaving the administrative region S4, the amount of native users entering the administrative region S5, and the amount of native users leaving the administrative region S6; a list containing users entering the administrative region T1, a list containing users leaving the administrative region T2, a list containing foreign users entering the administrative region T3, a list containing foreign users leaving the administrative region T4, a list containing native users entering the administrative region T5, and a list containing native users leaving the administrative region T6; and a maximum signalling time difference Tc21 between Cancel Location and a Location Update Request.

Step 2: the FDD_LTE network coverage of the whole city B is selected for data acquisition.

Step 3: as shown in FIG. 9, by virtue of a method of signalling tracking on the interface X2, it is acquired and recorded location update messages of which the location update type is "Normal" within the whole network coverage of city B. It is obtained the sending time TIME_LUP of the Tracking Area Update Request message, and a TAI in the Tracking Area Update Request message. It is further obtained a TAC from the TAI. If there is an Identity Response message during this tracking area update, then it is obtained the IMSI_TUP from the Identity Response message, or obtained the IMSI_TUP from a Common ID message. They are shown in Table 12 (i.e. the first list).

TABLE 12

| TIME_TUP | LAC_TUP | IMSI_TUP |
|---|---|---|
|  |  |  |
|  |  |  |
|  |  |  |
|  |  |  |

Step 4: within the time range from Tstart to Tend, by virtue of the method of signalling tracking on the interface X2, it is recorded all trans-MME tracking area update flows. It is calculated the maximum signalling time difference from a Tracking Area Update Accept message to the Tracking Area Update Request message with respect to each trans-MME tracking area update flow, and the maximum signalling time difference serves as Tc21.

Figure 8:
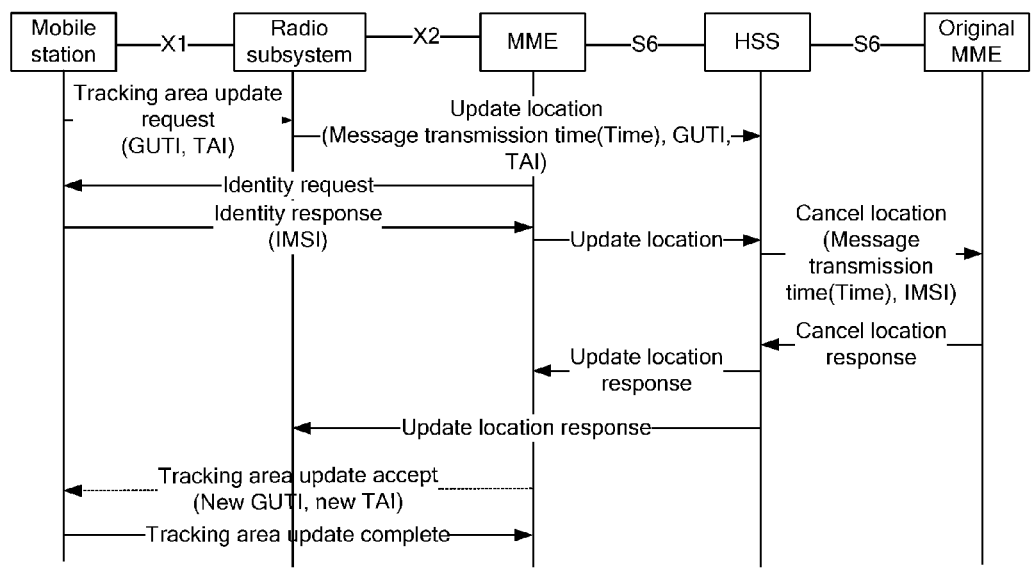
FIG. 8 is a diagram of a trans-MME tracking area update flow.

Step 5: it is acquired a clock difference between the interface X2 and the interface X6 as shown in FIG. 8, and the clock difference is represented by Δt.

Step 6: as shown in FIG. 10, by virtue of the method of signalling tracking on the interface X6, it is acquired and recorded Cancel Location messages received by all MMEs in the city B. It is also obtained Time_CL (the time when the Cancel Location message starts to be sent) and IMSI_CL information in each Cancel Location message. They are shown in Table 13 (i.e. the third list).

TABLE 13

| Time_CL | IMSI_CL |
|---|---|
|  |  |
|  |  |
|  |  |
|  |  |

Step 7: it is acquired a set of all TACs in the city B by virtue of wireless network configuration information, as shown in Table 14.

TABLE 14

| TAC_CONF |
|---|
|  |
|  |
|  |
|  |

Step 8: it is acquired a list containing all IMSIs in all HSSs belonging to the city B, as shown in Table 15 (i.e. the second list).

TABLE 15

| IMSI_HSS |
|---|
|  |
|  |
|  |
|  |

Figure 11:
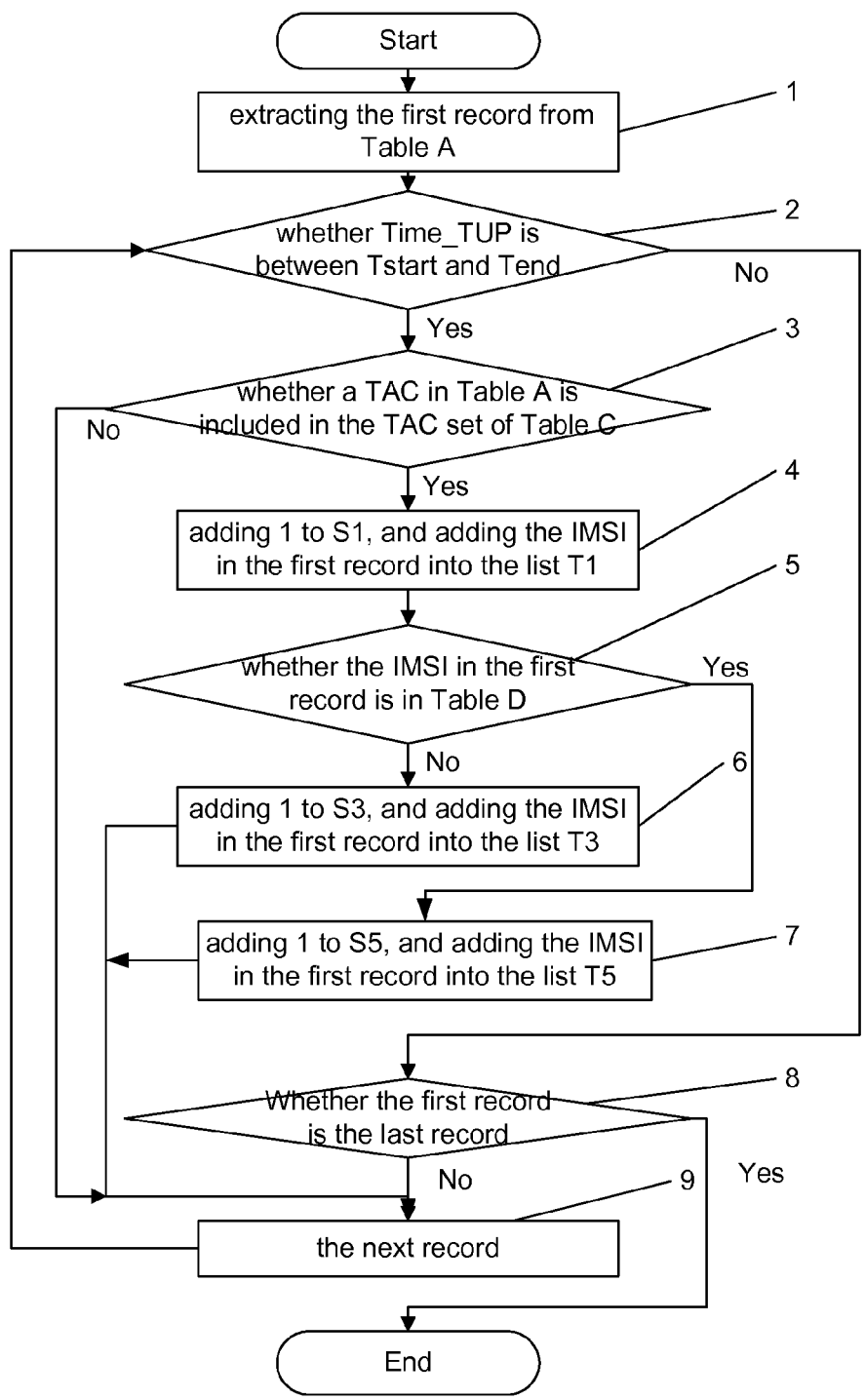
FIG. 11 is a flowchart of acquiring statistics on the number of users entering an administrative region and a user list in GSM, WCDMA, TD-SCDMA, FDD-LTE and TDD-LTE networks according to an embodiment of the disclosure.

Step 9: within the set time range from Tstart to Tend, it is searched out the records of which the TIME_TUP is between Tstart and Tend from Table 12 one by one. It is determined whether each TAC_TUP corresponding to a TIME_TUP which is between Tstart and Tend is included in the TAC_CONF set in Table 14 or not. If not, S1 increases by 1, and the IMSI_TUP corresponding to the TIME_TUP which is between Tstart and Tend and corresponding to the TAC_TUP which is not included in Table 14 is added into the list T1. Furthermore, it is determined whether the IMSI_TUP corresponding to the TIME_TUP which is between Tstart and Tend is included in Table 15 or not. If not, S3 increases by 1, and the IMSI_TUP which corresponds to the TIME_TUP between Tstart and Tend but not included in Table 15 is added into the list T3. If yes, S5 increases by 1, and the IMSI_TUP which corresponds to the TIME_TUP between Tstart and Tend and is included in Table 15 is added into the list T5. The operation continues until all the records of which the Time-TUP is within the range of Tstart and Tend in Table 12 are determined, as shown in FIG. 11.

Step 10: within the set time range from Tstart to Tend, it is searched out the records of which the Time-CL is between Tstart and Tend from Table 13 one by one. It is determined, among records in Table 12 of which Time_TUP is within the time range from Time_CL-$\Delta$t-Tc21 to Time_CL-$\Delta$t, whether the IMSI_CL corresponding to the Time-CL which is between Tstart and Tend is subjected to location update. If not, S2 increases by 1, and the IMSI_CL which corresponds to the Time-CL between Tstart and Tend but is not subjected to location update is added into the list T2. Furthermore, it is determined whether the IMSI_CL corresponding to the Time-CL which is between Tstart and Tend is included in the Table 15. If not, S4 increases by 1, and the IMSI_CL which corresponds to the Time-CL between Tstart and Tend but is not included in the Table 15 is added into the list T4. If yes, S6 increases by 1, and the IMSI_LUP which corresponds to the Time-CL between Tstart and Tend and is included in the Table 15 is added into the list T6. The operation continues until all the records of which Time_CL is within the range from Tstart to Tend in Table 13 are determined, as shown in FIG. 7.

Step 11: S1, S2, S3, S4, S5 and S6 in Step 9 and Step 10 are combined into a statistical table of the FDD-LTE network users entering and leaving the administrative region of the city B.

TABLE 16

| Statistics on the amount of users entering the administrative region of the city B | S1 |
|---|---|
| Statistics on the amount of users leaving the administrative region of the city B | S2 |
| Statistics on the amount of foreign users entering the administrative region of the city B | S3 |
| Statistics on the amount of foreign users leaving the administrative region of the city B | S4 |
| Statistics on the amount of native users entering the administrative region of the city B | S5 |
| Statistics on the amount of native users leaving the administrative region of the city B | S6 |

TABLE 17

| IMSI list (T1) of users entering the administrative region of the city B |
|---|
|  |
|  |
|  |
|  |

TABLE 18

| IMSI list (T2) of users leaving the administrative region of the city B |
|---|
|  |
|  |
|  |
|  |

TABLE 19

| IMSI list (T3) of foreign users entering the administrative region of the city B |
|---|
|  |
|  |
|  |
|  |

TABLE 20

| IMSI list (T4) of foreign users leaving the administrative region of the city B |
|---|
|  |
|  |
|  |
|  |

TABLE 21

| IMSI list (T5) of foreign users leaving the administrative region of the city B |
|---|
|  |
|  |
|  |
|  |

TABLE 22

| IMSI list (T6) of foreign users leaving the administrative region of the city B |
|---|
|  |
|  |
|  |
|  |

Step 14: according to the IMSI lists of the users entering and leaving the administrative region of the city B under the operator, it is obtained the user information, such as telephone numbers, usernames and communication addresses, from the operator in the city B.

The above is only preferred embodiments of the disclosure and not intended to limit the disclosure. Those skilled in the art can make various modifications and variations over the disclosure. Any modification, equivalent replacement, improvement and the like made within the principle of the disclosure shall fall within the scope of protection of the disclosure.

INDUSTRIAL APPLICABILITY

According to the embodiments of the disclosure, by determining whether the LAC or TAC reported during the location update or tracking area update within a statistical area is within a LAC or TAC set to which the statistical area belongs, the information of a user entering the administrative region is obtained. Moreover, an IMSI in a cancel location message is extracted, and it is determined whether the extracted IMSI is subjected to location update or tracking area update within the statistical area before the transmission time of the cancel location messages, so that the information of a user leaving the administrative region is obtained. Therefore, with the embodiments of the disclosure, the information of mobile users floating between cities, provinces and countries can be acquired more accurately. In addition, to implement the embodiments of the disclosure, it is unnecessary to modify the current core network and radio access network, and thus the investment cost of an operator is greatly lowered.

What is claimed is:

1. A method for obtaining information of mobile phone users floating between administrative regions, comprising:

within a statistical time range of the information of floating mobile phone users, making statistics on the mobile phone users entering an administrative region by virtue of final valid location information contained in location update request messages sent by the mobile phones changing their location areas, International Mobile Subscriber Identity information of the mobile phones changing their location areas (IMSI_LUP) and a set of Location Area Codes of the administrative region (LAC_CONF set); and within the statistical time range of the information of the floating mobile phone users, making statistics on the mobile phone users leaving the administrative region by virtue of International Mobile Subscriber Identity information contained in all cancel location messages (IMSI_LC), wherein the cancel location messages are received by Visitor Location Registers (VLRs) in the administrative region, wherein the final valid location information contained in the location update request messages includes Location Area Code (LAC_LUP), wherein the making statistics on the mobile phone users entering the administrative region comprises:

searching out one by one an LAC which corresponds to the final valid location information but is beyond the LAC_CONF set, and determining a mobile phone user whose IMSI_LUP information corresponds to the LAC beyond the LAC_CONF set as the user entering the administrative region, wherein the making statistics on the mobile phone users leaving the administrative region comprises:

performing one-by-one searching to determine whether the IMSI_LC in each cancel location message is subjected to location update or tracking area update before the cancel location message is sent, and determining a mobile phone user whose IMSI_LC is not subjected to the location update or tracking area update as the user leaving the administrative region.

2. The method according to claim 1, wherein the final valid location information contained in the location update request and the IMSI_LUP information of the mobile phones changing their location areas are obtained in a manner of:

acquiring and recording all trans-Visitor-Location-Register (trans-VLR) location update or tracking area update flows on an interface A between a radio subsystem and a Mobile Switching Centre (MSC) or a Mobility Management Entity (MME) within whole coverage of a network element for data acquisition in the administrative region;

obtaining sending time (TIME_LUP) of location update request messages or tracking area request messages and LAC_LUPs from the location update request messages or the tracking area request messages of the mobile phones;

obtaining the IMSI_LUPs from identity response messages; and establishing a first list comprising the TIME_LUP, the LAC_LUP and the IMSI_LUP for each location update or tracking area update.

3. The method according to claim 2, wherein the LAC_CONF set is obtained in a manner of:

acquiring the LAC_CONF set within the whole coverage of the network element for data acquisition in the administrative region, and establishing a second list comprising all the LAC_CONFs.

4. The method according to claim 3, wherein the making statistics on the mobile phone users entering the administrative region comprises:
   searching out records in which the TIME_LUP is within the statistical time range from the first list one by one;
   determining one by one whether the LAC_LUP corresponding to the TIME_LUP which is within the statistical time range is comprised in the second list containing the LAC_CONF set; and
   determining the mobile phone user corresponding to the LAC_LUP which is not comprised in the LAC_CONF set as the user entering the administrative region.

5. The method according to claim 2, wherein the IMSI_LC information contained in all the cancel location messages received by the VLR in the administrative region is obtained in a manner of:
   acquiring and recording all cancel location messages which are sent from a Home Location Reqister (HLR) or a Home Subscriber Server (HSS) to the VLR on an interface D between the HLR or HSS and the VLR or the MME within the whole coverage of the network element for data acquisition in the administrative region;
   obtaining sending time (TIME_LC) of each cancel location message and the IMSI_LC in each cancel location message; and
   establishing a third list comprising the TIME_LC and IMSI_LC corresponding to each cancel location message.

6. The method according to claim 5, wherein the making statistics on the mobile phone users leaving the administrative region comprises:
   searching out records in which the TIME_LC is within the statistical time range from the third list one by one;
   extracting an IMSI_LC from the record in which the TIME_LC is within the statistical time range;
   determining whether there is an IMSI_LUP in the first list corresponding to the extracted IMSI_LC when the TIME_LUP is between Time_LC-Δt-Tc21 and Time_LC-Δt; and
   in the case there is no IMSI_LUP in the first list corresponding to the extracted IMSI_LC when the TIME_LUP is between Time_LC-Δt-Tc21 and Time_LC-Δt, determining the user corresponding to the extracted IMSI_LC as the user leaving the administrative region,
   wherein Δt is a clock difference between the interface A and the interface D, and Tc21 is a maximum signalling time difference between a location update request on the interface A and the cancel location message on the interface D.

7. A device for obtaining information of mobile phone users floating between administrative regions, comprising:
   an administrative-region-entering user information acquisition module, configured to, within a statistical time range of the information of floating mobile phone users, make statistics on the mobile phone users entering an administrative region by virtue of final valid location information contained in location update requests messages sent by the mobile phones changing their location areas, International Mobile Subscriber Identity information of the mobile phones changing their location areas (IMSI_LUP) and a set of Location Area Codes of the administrative region (LAC_CONF set); and
   an administrative-region-leaving user information acquisition module, configured to, within the statistical time range of the information of the floating mobile phone users, make statistics on the mobile phone users leaving the administrative region by virtue of International Mobile Subscriber Identity information contained in all cancel location messages (IMSI_LC), wherein the cancel location messages are received by Visitor Location Registers (VLRs) in the administrative region,
   wherein the final valid location information contained in the location update request messages includes Location Area Code (LAC_LUP),
   wherein the administrative-region-entering user information acquisition module comprises:
      a first searching module, configured to search out an LAC which corresponds to the final valid location information but is beyond the LAC_CONF set; and
      a first statistical module, configured to determine a mobile phone user whose IMSI_LUP information corresponds to the LAC beyond the LAC_CONF set as the user entering the administrative region,
   wherein the administrative-region-leaving user information acquisition module comprises:
      a second searching module, configured to perform one-by-one searching to determine whether the IMSI_LC in each cancel location message is subjected to location update or tracking area update before the cancel location message is sent; and
      a second statistical module, configured to determine a mobile phone user whose IMSI_LC is not subjected to location update or tracking area update as the users leaving the administrative region.

* * * * *